(12) United States Patent
Lv

(10) Patent No.: US 6,689,514 B2
(45) Date of Patent: Feb. 10, 2004

(54) HIGH-TEMPERATURE NI-MH BATTERY AND A METHOD FOR MAKING THE SAME

(75) Inventor: Haigang Lv, Guangdong Province (CN)

(73) Assignee: BYD Battery Co., Ltd., Shenzhen (CN)

( * ) Notice: Subject to any disclaimer, the term of this patent is extended or adjusted under 35 U.S.C. 154(b) by 0 days.

(21) Appl. No.: 09/726,645

(22) Filed: Nov. 29, 2000

(65) Prior Publication Data

US 2001/0000484 A1 Apr. 26, 2001

Related U.S. Application Data

(63) Continuation of application No. PCT/CN00/00074, filed on Apr. 5, 1999.

(30) Foreign Application Priority Data

Apr. 5, 1999 (CN) .......................... 99116113 A

(51) Int. Cl.$^7$ .............................. H01M 4/62; H01M 4/52
(52) U.S. Cl. ...................... 429/232; 429/217; 429/223; 29/623.2
(58) Field of Search ................................ 429/217, 223, 429/218.2, 232; 29/623.2

(56) References Cited

U.S. PATENT DOCUMENTS

| | | | | | |
|---|---|---|---|---|---|
| 6,017,655 | A | * | 1/2000 | Ovshinsky et al. | 429/232 |
| 6,042,753 | A | * | 3/2000 | Izumi et al. | 429/223 X |
| 6,177,213 | B1 | * | 1/2001 | Fetcenko et al. | 429/223 X |
| 6,268,083 | B1 | * | 7/2001 | Iida et al. | 429/218.2 |
| 6,287,724 | B2 | * | 9/2001 | Singh et al. | 429/218.2 |
| 6,338,917 | B1 | * | 1/2002 | Maeda et al. | 429/223 |

* cited by examiner

Primary Examiner—Stephen Kalafut
(74) Attorney, Agent, or Firm—Stephen M. De Klerk

(57) ABSTRACT

The present invention relates a high-temperature Ni—MH battery and the method for making the same. By adding a titanium additive in the anode materials at an amount of 0.1–15.0% (weight), based on the weight of the active spherical nickel hydroxide, the high-temperature charging efficiency of the Ni—MH battery can be greatly improved. The charging efficiency of the Ni—MH battery of the present invention can reach 95% at a temperature higher than 50° C. The Ni—MH battery of the present invention can be used at a temperature of 50° C. or higher.

10 Claims, 3 Drawing Sheets

HIGH-TEMPERATURE NI-MH BATTERY AND A METHOD FOR MAKING THE SAME

This is a continuation application of patent application No. PCT/CN00/00074 filed Apr. 5, 1999, which claims priority from Chinese patent application No. 991161130 filed on Apr. 5, 1999.

FIELD OF THE INVENTION

The present invention relates to a high-temperature Ni—MH battery and a method for making the same.

BACKGROUND OF THE INVENTION

The present Ni—MH battery usually comprises a pair of electrodes composed of a Ni cathode of nickel hydroxide, an anode of hydrogen-storing alloy, and a separator, and KOH solution is used as electrolyte. The cathode is made by mixing an active material Ni $(OH)_2$, an electroconductive agent, an adhesive agent and water to make a syrup, and filling the syrup into an alkali-resistance basic plate.

In the Ni—MH battery adopting the cathode mentioned above, two reactions will take place on the cathode during charge, namely the following reaction (1) and reaction (2). The reaction (1) is the charging reaction of NI $(OH)_2$ on the cathode; the reaction (2) is the oxygen-formation reaction. When the temperature arises, the electric potential of reaction (2) will decrease, which will decrease the electric potential difference between reaction (2) and reaction (1).

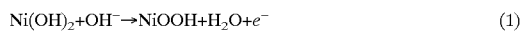

$$Ni(OH)_2 + OH^- \rightarrow NiOOH + H_2O + e^- \quad (1)$$

$$4OH^- \rightarrow 2H_2O + O_2 + 4\ e^- \quad (2)$$

The competition between the two reactions mentioned above results in low charging efficiency of the cathode mentioned above. At the temperature of 50° C., the charging efficiency can only reach 50–60%, which severely influences the performance of battery at high temperatures.

Japanese patent 8-31448 disclosed a high-temperature battery and a method for making the same. According to this patent, $CeO_2$, $Ce(OH)_3$, $Ce(OH)_4$, $H_2O$, $Nd_2O_3$, and $Nd(OH)_3$ were added into the Ni cathode material as additives to improve the charging efficiency of the cathode. For instance, at 45° C., the charging efficiency of the battery can reach 80–90%. However, this improvement is not enough. Nowadays, the Ni—MH battery has been used at high temperatures more and more common, and the Ni—MH battery with higher high-temperature performance is required. The present invention is based on this.

OBJECTS OF THE INVENTION

One object of the present invention is to provide a Ni—MH battery for using at high temperatures.

Another object of the present invention is to provide a method for making the Ni—MH battery for using at high temperatures.

SUMMARY OF THE INVENTION

The present invention provides a high-temperature Ni—MH battery, comprising a cathode plate made up of a base place and cathode substances adhering on the base plate, an anode plate made up of a base plate and anode substances adhering on the base plate, a separator, a steel housing, built-up covers, characterized in that: the said cathode base plate is selected from the base plates of foamed nickel, fiber nickel, and porous steel strip; the said cathode substances comprise an active material of spherical nickel hydroxide, an electroconductive agent, and adhesive and an additive; in which, the said electroconductive agent is at least one selected from the group consisting of nickel powder, carbon powder, acetylene black, graphite powder, cadmium powder, zinc powder, Co—Zn alloy powder, cobalt powder, CoO, $Co_2O_3$, $Co(OH)_2$ and $Co(OH)_3$; the said adhesive is at least one selected from the group consisting of PTFE, CMC MC and PVA; the said additive is selected from the titanium additives which can restrain the electric potential descent in the oxygen-formation reaction at the Ni cathode during the charging at a temperature over 40° C.

The present invention also provides a method for making the high-temperature Ni—MH battery as mentioned above, comprising the following steps:

(1) making a cathode plate: mixing nickel hydroxide, an electroconductive agent, a titanium additive, an adhesive and water together, stirring the resulting mixture homogeneously, filling the homogeneous mixture into a cathode base plate which has been welded with electrode terminals, baking to dry, roller-compacting it to a desired thickness to obtain a cathode plate;

(2) making an anode plate: mixing a hydrogen-storing alloy powder, an electroconductive agent, an adhesive and water together, stirring the resulting mixture homogeneously, filling the homogeneous mixture into an anode base plate which has been welded with electrode terminals, baking to dry, roller-compacting it to a desire thickness to obtain an anode plate;

(3) Selecting a proper separator, putting it between the cathode and the anode made above, pressing them together tightly, or convoluting into a cylinder, and then putting it into a quadrate or cylindrical steel housing;

(4) Welding electrodes, injecting an electrolyte solution and then sealing;

(5) Battery activating;

(6) Battery assembling.

DETAILED DESCRIPTION OF THE INVENTION

Figure 1:
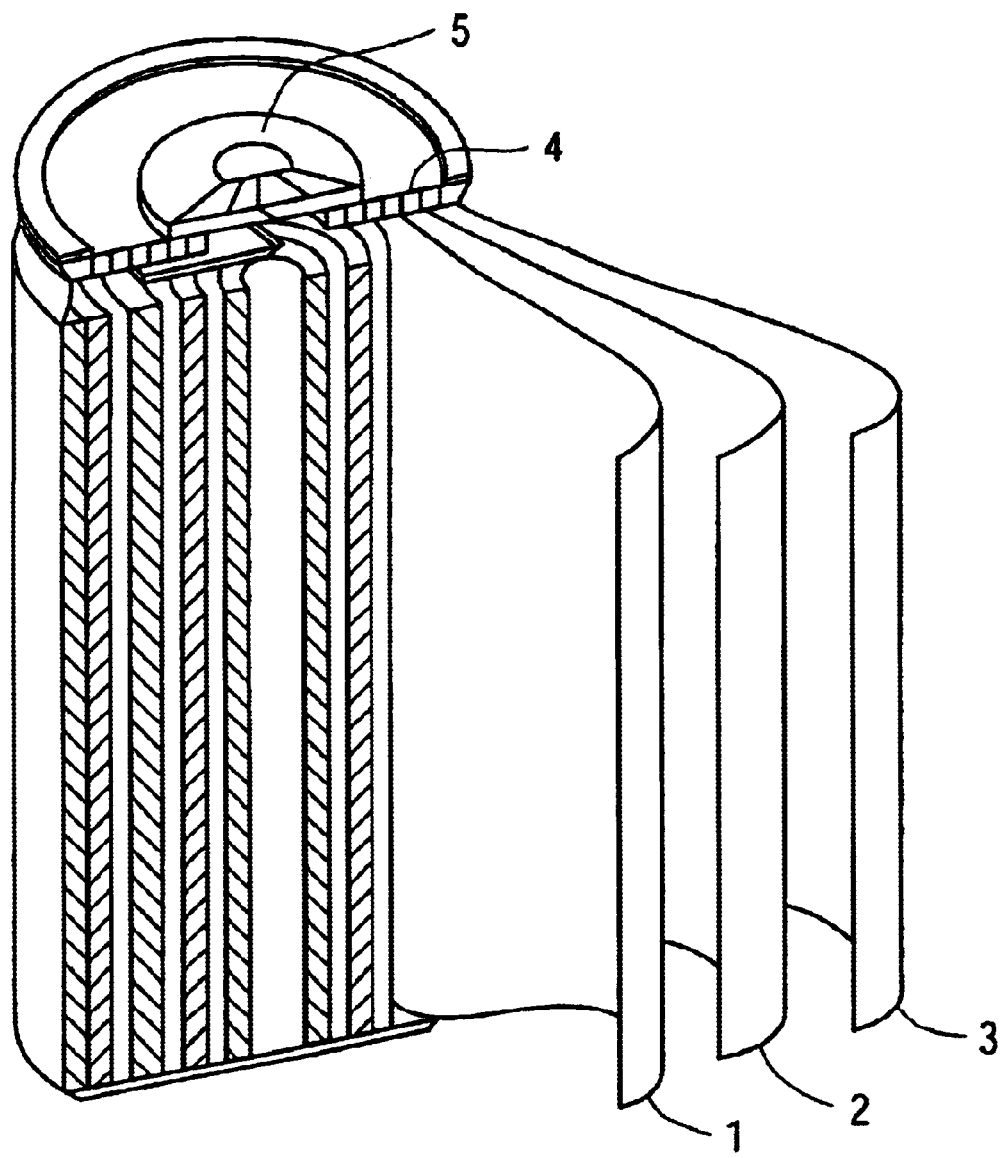
FIG. 1 is the sectional view of the high-temperature Ni—MH battery of the present invention.

According to one aspect of the present invention, the present invention provides a high-temperature Ni—MH battery. As is shown in FIG. 1, the said battery comprises a cathode plate 1 made up of a base plate and cathode substances adhering on the base plate, an anode plate 3 made up of a base plate and anode substances adhering on the base plate, a separator 2, a steel housing 4, built-up covers 5, characterized in that: the said cathode base plate is selected from the base plates of foamed nickel, fiber nickel, and porous steel strip; the said cathode substances comprise an active material of spherical nickel hydroxide, an electroconductive agent, an adhesive and an additive; in which, the said electroconductive agent is at least one selected from the group consisting of nickel powder, carbon powder, acetylene black, graphite powder, cadmium powder, zinc powder, Co—Zn alloy powder, cobalt powder, CoO, $Co_2O_3$, Co(OH)$_2$ and Co(OH)$_3$; the said adhesive is at least one selected from the group consisting of PTFE, CMC, MC and PVA; the said additive is selected from the titanium additives which can restrain the electric potential descent in the oxygen-formation reaction at the Ni cathode during the charging at a temperature over 40° C.

According to the high-temperature Ni—MH battery of the present invention, in which, the said titanium additive is at least one selected from the group consisting metal titanium, Ti(OH)$_2$, Ti(OH)$_3$, TiO, Ti$_2$O$_3$, TiO$_2$,Ti$_3$O$_5$, titanates and titanium salts.

According to the high-temperature Ni—MH battery of the present invention, in which, the amount of the said titanium additive is preferably in the range of 1.0–5.0% (weight), based on the spherical nickel hydroxide in the cathode substances.

According to the high-temperature Ni—MH battery of the present invention, in which, the amount of the said titanium additive is in the range of 0.1–15.0% (weight), based on the spherical nickel hydroxide in the cathode substances.

According to the high-temperature Ni—MH battery of the present invention, in which, the said anode base plate is selected from foamed nickel base plate, fiber nickel base plate, and porous steel strip base plate. The said anode substances comprise an AB5 or AB2 type hydrogen-storing alloys, an electroconductive agent, an adhesive; in which, the electroconductive agent is at least selected from the group consisting nickel powder, carbon powder, acetylene black, graphite powder, cadmium powder, zinc powder, Co—Zn alloy powder, cobalt powder, CoO, Co$_2$O$_3$, Co(OH)$_2$ and Co(OH)$_3$; the said adhesive is at least one selected from the group consisting of PTFE, CMC, MC and PVA.

Figure 2:
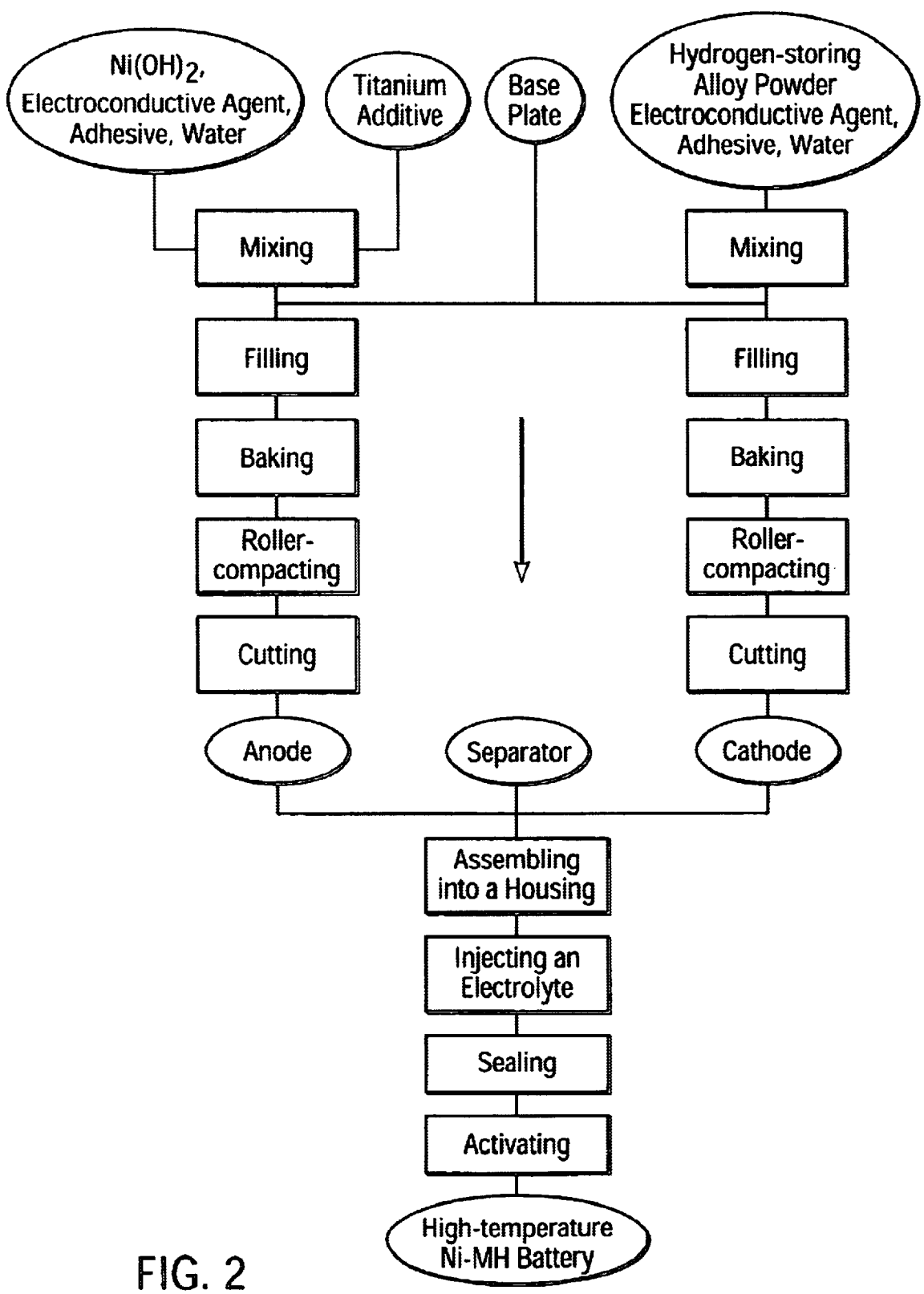
FIG. 2 Is the flow sheet for making the high-temperature Ni—MH battery of the present invention.

According to another aspect of the present invention, the present invention provides a method for making the high-temperature Ni—MH battery, the flow sheet is shown in FIG. 2. The method comprises the following steps.

(1) making a cathode plate: mixing nickel hydroxide, an electroconductive agent, a titanium additive, an adhesive and water together, stirring the resulting mixture homogeneously, filling the homogeneous mixture into a cathode base plate which has been welded with electrode terminals, baking to dry, roller-compacting it to a desired thickness to obtain a cathode plate;
(2) making an anode plate: mixing a hydrogen-storing alloy powder, an electroconductive agent, an adhesive and water together, stirring the resulting mixture homogeneously, filling the homogeneous mixture into an anode base plate which has been welded with electrode terminals, baking to dry, roller-compacting it to a desired thickness to obtain an anode plate;
(3) Selecting a proper separator, putting it between the cathode and the anode made above, pressing them together tightly, or convoluting into cylinder, and then putting it into a quadrate or cylindrical steel housing;
(4) Welding electrodes, injecting an electrolyte solution and then sealing;
(5) Battery activating;
(6) Battery assembling.

According to the method of the present invention, in which, the said titanium additive is at least one selected from the group consisting metal titanium, Ti(OH)$_2$, Ti(OH)$_3$, TiO, Ti$_2$O$_3$, TiO$_2$,Ti$_3$O$_5$, titanates and titanium salts.

According to the method of the present invention, in which, the amount of the said titanium additive is in the range of 0.1–15.0% (weight), based on the spherical nickel hydroxide in the cathode substances.

According to the method of the present invention, in which, the amount of the said titanium additive Is preferably in the range of 1.0–5.0% (weight), based on the spherical nickel hydroxide in the anode substances.

According to the method of the present invention, in which, the said anode base plate is selected from foamed nickel base plate, fiber nickel base plate, and porous steel strip base plate. The said anode substances comprise an AB5 or AB2 type hydrogen-storing alloys, an electroconductive agent, an adhesive; in which, the electroconductive agent is at least one selected from the group consisting nickel powder, carbon powder, acetylene black, graphite powder, cadmium powder, zinc powder, Co—Zn alloy powder, cobalt powder, CoO, Co$_2$O$_3$, Co(OH)$_2$ and Co(OH)$_3$; the said adhesive is at least one selected from the group consisting of PTFE, CMC, MC and PVA.

According to the high-temperature Ni—MH battery of the present invention, in which, the electrolyte is those usually used in the Ni—MH battery.

According to the method of the present Invention, in which, the battery activating and battery assembling methods are those well-known by the skilled person in the art.

According to the present invention, In which, the separator 2 are those well known by the skilled person in the art, such as the modified polypropylene separator.

In the high-temperature Ni—MH battery of the present invention, a titanium additive is added in the cathode particularly the amount of the said titanium additive is more than 1.0% (weight) based on the weight of the active spherical nickel hydroxide in the cathode substances. Therefore, when the high-temperature Ni—MH battery of the present inventions is used at high temperatures, the electric potential of the following oxygen formation reaction (2) carried out on the nickel hydroxide cathode rises greatly:

$$4OH^- \rightarrow 2H_2O+O_2+4e^- \qquad (2)$$

and the following reaction (1) can be carried out thoroughly.

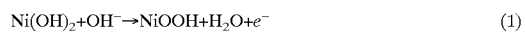

$$Ni(OH)_2+OH^- \rightarrow NiOOH+H_2O+e^- \qquad (1)$$

The amount of formed NiOOH increases, so that the charging efficiency of the anode has been enhanced greatly. At a temperature of 50° C. or higher temperatures, the charging efficiency of the battery of the present invention can reach 95%, which can satisfy the requirements on the battery performance at high temperatures.

Figure 3:
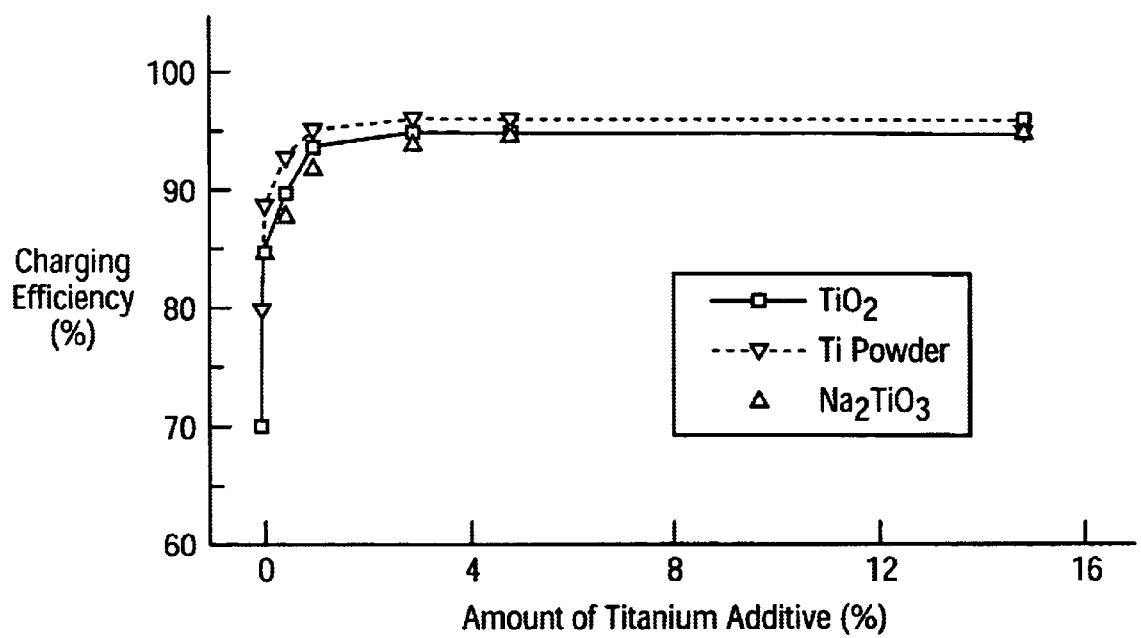
FIG. 3 is a graph showing the relationship between the amount of the titanium additives and the charging efficiency of the battery.

FIG. 3 shows the relationship between the amount of the titanium additive and the charging efficiency of the battery. As it can be seen from FIG. 3, the addition of titanium additive, such as titanium dioxide, metal titanium powder, and/or sodium titanates, in the cathode can greatly increase the charging efficiency of the high-temperature Ni—MH battery of the present invention. When the amount of the said titanium additive is more than 1.0% (weight), based on the weight of spherical nickel hydroxide in the cathode substances, the charging efficiency of the battery can reach 95% or higher. According the present invention, the amount of the titanium additive is in the range of 0.1–15.0% (weight), based on the weight of the active spherical nickel hydroxide in the cathode substances. It can be seen further from FIG. 3, when the amount of the said titanium additive is less than 1.0% (weight), based on the weight of the active spherical nickel hydroxide in the cathode substances, the charging efficiency of the battery cannot reach 95%. When the amount is more than 5% (weight), the increase of the charging efficiency of the battery is not proportional to the increase of the amount of the said titanium additive.

Therefore, the amount of the said titanium additive is preferably in the range of 1.0–5.0% (weight), based on the weight of the active spherical nickel hydroxide in the cathode substances.

THE BEST MODES FOR CARRYING OUT THE INVENTION

The high-temperature Ni—MH battery of present invention will be described in detail in combination with the drawings and the following Examples.

EXAMPLE 1

90 parts by weight of spherical $Ni(OH)_2$ powder, 10 parts by weight of CoO powder, 1.0 part by weight of $TiO_2$ powder, 0.3 part by weight of CMC, 1.0 part by weight of PTFE, and 45 parts by weight of water were mixed together. The mixture was stirred homogeneously, then the obtained homogeneous mixture was filled into a foamed nickel base plate. The obtained base plate was baked to dry, then it was roller-compacted and cut to desired size to obtain a cathode 1.

95 parts by weight of a $AB_5$ type hydrogen-storing alloy powder $MmNi_{3.7}Co_{0.7}Mn_{0.3}Al_{0.3}$ (in which, Mm is a mixed rare earth metal), 4 parts by weight of carbon powder, 1 part by weight of CMC powder and 50 parts by weight of water were mixed together. The mixture was stirred homogeneously, then the obtained homogeneous mixture was filled into a foamed nickel base plate. The obtained base plate was baked to dry, then it was roller-compacted and cut to desired size to obtain an anode 3.

Subsequently, the above made anode 3 and cathode 1 were put together, and a modified polypropylene separator 2 was inserted between the anode 3 and the cathode 1. The obtained structure was rolled and was put into a cylindrical steel housing 4. An alkaline electrolyte solution containing KOH, NaOH and LiOH was injected into the housing. After welding built-up covers 5, the housing was sealed. Thus, an AA type Ni—MH battery as shown by FIG. 1 was obtained.

The obtained battery was activated at room temperature, and was circled thoroughly to make the battery having a stable capacity. It was charged at room temperature under 0.06C for 24 hours, and discharged under 1.0C to 1.0 V to obtain a capacity of $C_0$. By adopting the same procedure, it was charged and discharged at 55° C. to obtain a capacity of $C_1$. The charge efficiency of the battery was calculated with the formula $F=C_1/C_0$, and the result were shown in FIG. 3.

EXAMPLES 2–6

The Ni—MH batteries of the present invention were prepared in the same manner and materials as explained in Example 1, instead of 1 part by weight of $TiO_2$ was replaced by 0.1, 3, 5, 15, and 0 part by weight of $TiO_2$. The charge efficiency of the obtained batteries was calculated in the same manner as explained in Example 1. The results were shown in FIG. 3.

EXAMPLES 7–11

The Ni-MH batteries of the present invention were prepared in the same manner and materials as explained in Example 1, instead of 1 part by weight of $TiO_2$ was replaced by 0. 1, 1, 3, 5, and 15 parts by weight of metal titanium powder. The charge efficiency of the obtained batteries was calculated in the same manner as explained in Example 1. The results were shown in FIG. 3.

EXAMPLES 12–16

The Ni—MH batteries of the present invention were prepared in the same manner and materials as explained in Example 1, instead of 1 part by weight of $TiO_2$ was replaced by 0.1, 1, 3, 5, and 15 parts by weight of $Na_2TiO_3$. The charge efficiency of the obtained batteries was calculated in the same manner as explained in Example 1. The results were shown in FIG. 3.

As in shown by the results, the addition of titanium additive n the nickel hydroxide cathode can greatly improve the charge efficiency of Ni—MH batteries at high temperatures.

What is claimed is:

1. A high-temperature Ni—MH battery, comprising a cathode plate (1) made up of a cathode base plate and cathode substances adhering on the cathode base plate, an anode plate (3) made up of an anode base plate and anode substances adhering on the anode base plate, and a separator (2), characterized in that: the said cathode base plate is selected from the base plate of foamed nickel, fiber nickel, and porous steel strip; the said cathode substances consist of an active material of spherical nickel hydroxide, an electroconductive agent, an adhesive and an additive; in which, the said electroconductive agent is at least one selected from the group consisting of nickel powder, carbon powder, acetylene black, graphite powder, cadmium powder, zinc powder, Co—Zn alloy powder, cobalt powder, CoO, $Co_2O_3$, $CO(OH)_2$ and $CO(OH)_3$; the said adhesive is at least one selected from the group consisting of PTFE, CMC,MC and PVA; the said additive is selected from the titanium additives which can restrain the electric potential descent in the oxygen-formation reaction at the Ni anode during charging at temperatures higher than 40° C.

2. The high-temperature Ni—MH battery as claimed in claim 1, characterized in that: the said titanium additive is at least one selected from the group consisting of metal titanium, $Ti(OH)_2$, $Ti(OH)_3$, TiO, $Ti_2O_3$, $TiO_2$, $Ti_3O_5$, titanates and titanium salts.

3. The high-temperature Ni—MH battery as claimed in claim 1 or 2, characterized in that: the amount of the said titanium additive is in the range of 0.1–15.0 wt % based on the weight of the spherical nickel hydroxide in the cathode substances.

4. The high-temperature Ni—MH battery as claimed in claim 3, characterized in that: the amount of the said titanium additive is in the range of 1.0–5.0 wt % based on the weight of the spherical nickel hydroxide in the cathode substances.

5. The high-temperature Ni—MH battery as claimed in claim 1 or 2 characterized in that: the said anode base plate is selected from foamed nickel base plate, fiber nickel base plate, and porous steel strip base plate, the said anode substances comprise an $AB_5$ or $AB_2$ type hydrogen-storing alloys, an electroconductive agent, and an adhesive; in which, the electroconductive agent is at least one selected from the group consisting of nickel powder, carbon powder, acetylene black, graphite power, cadmium powder, zinc powder, Co—Zn alloy powder, cobalt powder, CoO, $Co_2O_3$, $CO(OH)_2$ and $CO(OH)_3$; the said adhesive is at least one selected from the group consisting of PTFE, CMC, MC and PVA.

6. A method for making the high-temperature Ni—MH battery as claimed in claim 1, comprising:
   (1) making a cathode plate: mixing nickel hydroxide, an electroconductive agent, a titanium additive, an adhesive and water together, stirring the resulting mixture homogeneously, filling the homogeneous mixture into a cathode base plate which has been welded with electrode terminals, baking to dry, roller-compacting it to obtain a cathode plate;

(2) making an anode plate: mixing a hydrogen-storing alloy powder, an electroconductive agent, an adhesive and water together, stirring the resulting mixture homogeneously, filling the homogeneous mixture into an anode base plate which has been welded with electrode terminals, baking to dry, roller-compacting it to obtain an anode plate;

(3) putting a separator between cathode and the anode made above, pressing them together tightly and then putting it into a quadrate steel housing, or convoluting them into cylindrical model and then putting it into a cylindrical steel housing;

(4) welding the cathode and the anode respectively, injecting an electrolyte solution and then sealing; and (5) activating the resulting battery.

7. The method as claimed in claim 6, characterized in that: the said titanium additive is at least one selected from the group consisting of metal titanium, $Ti(OH)_2$, $Tl(OH)_3$, $TiO$, $Ti_2O_3$, $TiO_2$, $Ti_3O_5$, titanates and titanium salts.

8. The method as claimed in claim 6 or 7, characterized in that: the amount of the said titanium additive is in the range of 0.1–15.0 wt % based on the weight of the spherical nickel hydroxide in the cathode substances.

9. The method as claimed in claim 8, characterized in that: the amount of the said titanium additive is in the range of 1.0–5.0 wt % based on the weight of the spherical nickel hydroxide in the cathode substances.

10. The method as claimed in claim 6 or 7, characterized in that: the said anode base plate is selected from foamed nickel base plate, fiber nickel base plate, and porous steel strip base plate, the said anode substances comprise an $AB_5$ or $AB_2$ type hydrogen-storing alloys, an electroconductive agent, an adhesive; in which, the electroconductive agent is at least one selected from the group consisting of nickel powder, carbon powder, acetylene black, graphite power, cadmium powder, zinc powder, Co—Zn alloy powder, cobalt powder, $CoO$, $Co_2O_3$, $Co(OH)_2$ and $CO(OH)_3$; the said adhesive is at least one selected from the group consisting of PTFE, CMC, MC and PVA.

* * * * *